(12) United States Patent
Lim et al.

(10) Patent No.: US 12,744,208 B2
(45) Date of Patent: Sep. 22, 2026

(54) POSITIVE ELECTRODE FOR LITHIUM SECONDARY BATTERY, AND LITHIUM SECONDARY BATTERY COMPRISING SAME

(71) Applicant: LG Energy Solution, Ltd., Seoul (KR)

(72) Inventors: Sung Chul Lim, Daejeon (KR); Sang Seung Oh, Daejeon (KR); Hye Hyeon Kim, Daejeon (KR); Chi Ho Jo, Daejeon (KR); Tae Gu Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 680 days.

(21) Appl. No.: 18/025,548

(22) PCT Filed: Apr. 5, 2022

(86) PCT No.: PCT/KR2022/004830

§ 371 (c)(1),
(2) Date: Mar. 9, 2023

(87) PCT Pub. No.: WO2022/244977

PCT Pub. Date: Nov. 24, 2022

(65) Prior Publication Data

US 2023/0327103 A1 Oct. 12, 2023

(30) Foreign Application Priority Data

May 18, 2021 (KR) ........................ 10-2021-0064296
Feb. 9, 2022 (KR) ........................ 10-2022-0016953

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/364* (2013.01); *H01M 4/386* (2013.01); *H01M 4/505* (2013.01);
(Continued)

(58) Field of Classification Search
CPC ......... H01M 10/0525; H01M 10/4235; H01M 10/446; H01M 2004/027;
(Continued)

(56) References Cited

U.S. PATENT DOCUMENTS 10,741,838 B2 * 8/2020 Matsuda ............... H01M 4/505
2008/0118829 A1 * 5/2008 Nanno ................. H01M 4/525 252/182.1

(Continued)

FOREIGN PATENT DOCUMENTS

EP 3605678 A1 2/2020
JP 2003109662 A 4/2003

(Continued)

OTHER PUBLICATIONS

English Machine Translation: KR 20190124038 (Year: 2019).*

(Continued)

*Primary Examiner* — Holly Rickman
*Assistant Examiner* — Linda N Chau
(74) *Attorney, Agent, or Firm* — Lerner David LLP

(57) ABSTRACT

Provided is a positive electrode for a lithium secondary battery and a lithium secondary battery including the same, and the positive electrode contains a positive electrode additive represented by Formula 1 and a positive electrode mixture layer including a region with a needle-shaped crack structure in its cross-section after initial charging (activation), so an amount of gas such as oxygen generated by an irreversible additive, which is a positive electrode additive, during the subsequent charging/discharging is reduced, and
(Continued)

the migration path of lithium ions and/or electrons is able to be ensured. Therefore, an excellent effect of improving the battery safety and electrical performance of a lithium secondary battery is exhibited.

9 Claims, 1 Drawing Sheet

(51) Int. Cl.

| | |
|---|---|
| ***H01M 4/36*** | (2006.01) |
| ***H01M 4/38*** | (2006.01) |
| ***H01M 4/505*** | (2010.01) |
| ***H01M 4/583*** | (2010.01) |
| ***H01M 4/62*** | (2006.01) |
| ***H01M 10/0525*** | (2010.01) |
| ***H01M 10/42*** | (2006.01) |
| ***H01M 10/44*** | (2006.01) |

(52) U.S. Cl.
CPC ........... *H01M 4/583* (2013.01); *H01M 4/625* (2013.01); *H01M 10/0525* (2013.01); *H01M 10/4235* (2013.01); *H01M 10/446* (2013.01); *H01M 2004/027* (2013.01); *H01M 2004/028* (2013.01)

(58) Field of Classification Search
CPC ........... H01M 2004/028; H01M 4/131; H01M 4/133; H01M 4/364; H01M 4/386; H01M 4/483; H01M 4/505; H01M 4/525; H01M 4/583; H01M 4/587; H01M 4/625; Y02E 60/10
See application file for complete search history.

(56) References Cited

U.S. PATENT DOCUMENTS

| | | | | |
|---|---|---|---|---|
| 2013/0171524 | A1 | 7/2013 | Cho et al. | |
| 2015/0064577 | A1 | 3/2015 | Natsui et al. | |
| 2016/0133933 | A1 | 5/2016 | Choi et al. | |
| 2018/0013130 | A1 | 1/2018 | Ochiai et al. | |
| 2020/0203767 | A1 | 6/2020 | Cheng et al. | |
| 2020/0365904 | A1 | 11/2020 | Jeon et al. | |
| 2022/0181627 | A1 | 6/2022 | Park et al. | |
| 2022/0315435 | A1* | 10/2022 | Mizuno | H01M 4/131 |

FOREIGN PATENT DOCUMENTS

| | | | |
|---|---|---|---|
| JP | 2004207055 | A | 7/2004 |
| JP | 2005327521 | A | 11/2005 |
| JP | 2007287446 | A | 11/2007 |
| JP | 2008152923 | A | 7/2008 |
| JP | 5391630 | B2 | 1/2014 |
| JP | 2014132527 | A | 7/2014 |
| JP | 2015088268 | A | 5/2015 |
| JP | 2020527290 | A | 9/2020 |
| KR | 20130079109 | A | 7/2013 |
| KR | 20140049650 | A | 4/2014 |
| KR | 20180066694 | A | 6/2018 |
| KR | 20190078392 | A | 7/2019 |
| KR | 20190124038 | A | 11/2019 |
| KR | 20190141792 | A | 12/2019 |
| KR | 102073951 | B1 | 2/2020 |
| KR | 20210007808 | A | 1/2021 |
| WO | 2012165212 | A1 | 12/2012 |
| WO | 2020111580 | A1 | 6/2020 |

OTHER PUBLICATIONS

Extended European Search Report including Written Opinion for Application No. 22804832.8 dated Mar. 11, 2024, pp. 1-9.
International Search Report for Application No. PCT/KR2022/004830 mailed Jul. 26, 2022, pp. 1-3.

* cited by examiner

【FIG. 1a】
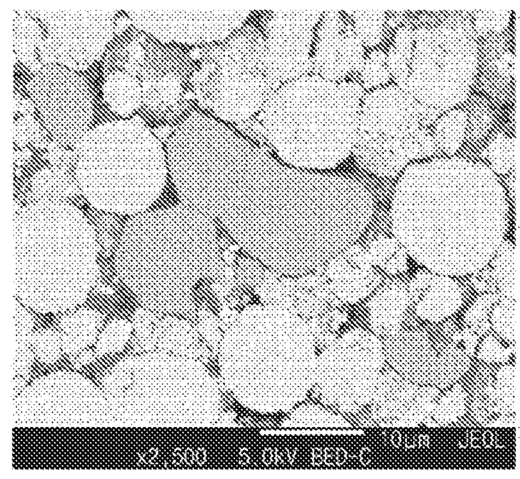
【FIG. 1b】
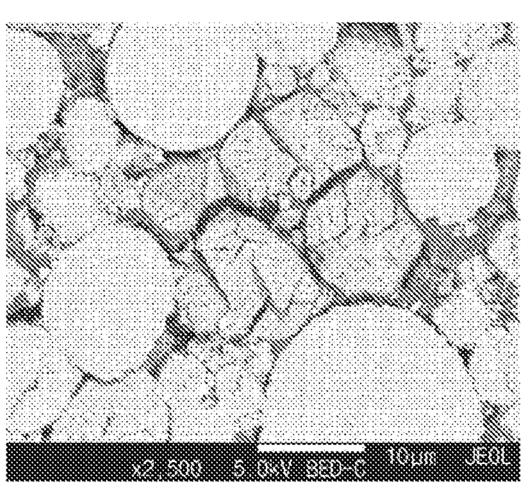

POSITIVE ELECTRODE FOR LITHIUM SECONDARY BATTERY, AND LITHIUM SECONDARY BATTERY COMPRISING SAME

CROSS-REFERENCE TO RELATED APPLICATIONS

This application is a national phase entry under 35 U.S.C. § 371 of International Application No. PCT/KR2022/004830, filed on Apr. 5, 2022, which claims priority to and the benefit of Korean Patent Application No. 10-2021-0064296, filed on May 18, 2021 and Korean Patent Application No. 10-2022-0016953, filed on Feb. 9, 2022, the disclosures of which are incorporated herein by reference in their entirety.

TECHNICAL FIELD

The present disclosure relates to a positive electrode for a lithium secondary battery and a lithium secondary battery including the same.

BACKGROUND ART

As technology development and demand for mobile devices increase, the demand for secondary batteries as an energy source is rapidly increasing. Among these secondary batteries, lithium secondary batteries that have a high energy density, a high operating potential, a long cycle life and a low self-discharging rate have been widely studied, commercialized and used in various fields.

Recently, as lithium secondary batteries are used as a power source for medium-to-large devices such as electric vehicles, the high capacity, high energy density and low cost of a lithium secondary battery are further required, and an irreversible additive used for an electrode is also required to have a higher irreversible capacity. However, it is true that there is a limitation to the development of a positive electrode additive having such a high irreversible capacity.

Meanwhile, a conventional irreversible additive such as $Li_6CoO_4$ is generally prepared by reacting an excess of metal oxides such as lithium oxide and cobalt oxide. The irreversible additive prepared as described above is structurally unstable and generates a large amount of oxygen gas ($O_2$) as charging progresses, and in the initial charging of a secondary battery, that is, the activation of a battery, when the irreversible additive does not react completely and remains, it may have a reaction in the subsequent charging/discharging process, causing side effects or generating a large amount of oxygen gas in the battery. The oxygen gas generated as described above may cause volume expansion of an electrode assembly, acting as one of the main factors causing the deterioration of battery performance.

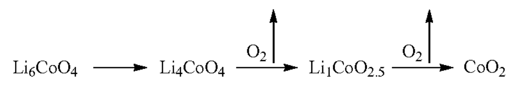

In addition, by-products such as lithium oxide may react with a binder component in the preparation of a slurry composition for preparing an electrode, resulting in an increase in viscosity or gelation of the composition. As a result, it is difficult to uniformly apply the electrode composition for forming an active material layer, and the characteristics of the battery are degraded.

Accordingly, to improve the safety and electrical performance of a lithium secondary battery, there is a demand for the development of technology that can reduce side reactions caused by an irreversible additive or the generation of gas such as oxygen ($O_2$) in charging/discharging.

RELATED ART DOCUMENT

Patent Document

Korean Unexamined Patent Application Publication No. 10-2019-0078392

DISCLOSURE

Technical Problem

Therefore, the present technology is directed to providing a positive electrode for a lithium secondary battery and a lithium secondary battery, which can reduce side reactions caused by an irreversible additive and an amount of gas such as oxygen (02) generated during charging/discharging, thereby realizing excellent battery safety and high charging/discharging capacity.

Technical Solution

To solve the above problems, one aspect of the present invention provides a positive electrode for a lithium secondary battery, which includes:

a positive electrode current collector; and a positive electrode mixture layer which is disposed on at least one surface of the positive electrode current collector and which includes a positive electrode active material and a positive electrode additive represented by Formula 1 below, wherein a cross-sectional structure of the positive electrode mixture layer after initial charging includes a first region having a dense structure filled with a first metal oxide particle, and a second region having a needle-shaped crack structure inside and outside a second metal oxide particle:

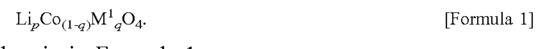

$Li_pCo_{(1-q)}M^1_qO_4$. [Formula 1]

wherein in Formula 1, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \leq p \leq 7$ and $0 \leq q \leq 0.5$, respectively.

Here, the second region may have a structure that is dispersed as an island shape in the first region.

In addition, the second region may account for 0.001 to 10% of the total cross-sectional area of the positive electrode mixture layer.

Moreover, the needle-shaped crack structure included in the second region may have cracks with an average thickness of 5 to 800 nm and an average length of 50 nm to 10 μm.

In addition, the positive electrode additive may have a tetragonal structure with a space group of $P4_2/nmc$.

Moreover, the positive electrode active material may be a lithium metal composite oxide represented by Formula 2 below:

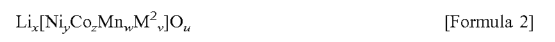

$Li_x[Ni_yCo_zMn_wM^2_v]O_u$ [Formula 2]

wherein in Formula 2, $M^2$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v and u are $1.0 \le x \le 1.30$, $0.1 \le y \le 0.95$, $0.01 \le z \le 0.5$, $0.01 \le w \le 0.5$, $0 \le v \le 0.2$, $1.5 \le u \le 4.5$, respectively.

In addition, the positive electrode mixture layer may further include one or more conductive materials selected from the group consisting of natural graphite, artificial graphite, carbon black, acetylene black, Ketjen black, and a carbon fiber.

Another aspect of the present invention provides a lithium secondary battery including the positive electrode of the present disclosure described above, a negative electrode, and a separator disposed between the positive electrode and the negative electrode.

Here, the negative electrode may include a negative electrode current collector; and a negative electrode mixture layer which is disposed on at least one surface of the negative electrode current collector and which contains a negative electrode active material.

In addition, the negative electrode active material may contain a carbon material and a silicon material, and the carbon material may include one or more of natural graphite, artificial graphite, carbon black, acetylene black, Ketjen black, carbon fiber, graphene or a carbon nanotube, and the silicon material may include one or more of a silicon (Si) particle or a silicon oxide ($SiO_x$, $1 \le X \le 2$) particle.

In addition, the silicon material may be included at 1 to 20 parts by weight with respect to 100 parts by weight of the negative electrode mixture layer.

Advantageous Effects

A positive electrode for a lithium secondary battery according to the present technology contains a positive electrode additive represented by Formula 1 in a positive electrode mixture layer, and has a region with a needle-shaped crack structure in the cross-section of the positive electrode mixture layer after initial charging (activation), thereby reducing an amount of gas such as oxygen generated by an irreversible additive, which is a positive electrode additive, during the subsequent charging/discharging and ensuring the migration path of lithium ions and/or electrons. Therefore, an excellent effect of improving the battery safety and electrical performance of a lithium secondary battery is exhibited.

BRIEF DESCRIPTION OF THE DRAWINGS

FIGS. 1(*a*) and 1(*b*) are a set of scanning electron microscope (SEM) images showing cross-sectional structures before and after the initial charging (activation) of a positive electrode for a lithium secondary battery according to the present disclosure, in which FIG. 1(*a*) is a cross-sectional structure before initial charging (activation), and FIG. 1(*b*) is a cross-sectional structure after initial charging (activation).

DETAILED DESCRIPTION OF THE PREFERRED EMBODIMENTS

The present invention may have various modifications and various examples, and thus specific examples are illustrated in the drawings and described in detail in the detailed description.

However, it should be understood that the present invention is not limited to specific embodiments, and includes all modifications, equivalents or alternatives within the spirit and technical scope of the present invention.

The terms "comprise," "include" and "have" used herein designate the presence of characteristics, numbers, steps, actions, components or members described in the specification or a combination thereof, but it should be understood that these terms do not preclude the possibility of the presence or addition of one or more other characteristics, numbers, steps, actions, components, members or a combination thereof.

In addition, when a part of a layer, film, region or plate is disposed "on" another part, this includes not only a case in which one part is disposed "directly on" another part, but also a case in which still another part is interposed therebetween. In contrast, when a part of a layer, film, region or plate is disposed "under" another part, this includes not only a case in which one part is disposed "directly under" another part, but also a case in which still another part is interposed therebetween. In addition, in this application, "on" may include not only a case of disposed on an upper part but also a case of disposed on a lower part.

Moreover, the "main component" used herein may be a component contained at 50 wt % or more, 60 wt % or more, 70 wt % or more, 80 wt % or more, 90 wt % or more, 95 wt % or more, or 97.5 wt % or more with respect to the total weight of a composition or specific component, and in some cases, when the main component constitutes the entire composition or specific component, it may be contained at 100 wt %.

In addition, the "Ah" used herein refers to a capacity unit of a lithium secondary battery, and is also called "ampere hour," meaning a current amount per hour. For example, when the battery capacity is "3000 mAh," it means that a battery can be discharged with a current of 3000 mA for 1 hour.

Hereinafter, the present invention will be described in further detail.

Positive Electrode for Lithium Secondary Battery

In one embodiment of the present invention, a positive electrode for a lithium secondary battery includes a positive electrode current collector, and a positive electrode mixture layer, which is disposed on at least one surface of the positive electrode current collector, and includes a positive electrode active material and a positive electrode additive represented by Formula 1 below, wherein a cross-sectional structure of the positive electrode mixture layer after initial charging includes a first region having a dense structure filled with a first metal oxide particle, and a second region having a needle-shaped crack structure inside and outside a second metal oxide particle:

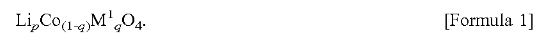

$$Li_pCo_{(1-q)}M^1_qO_4. \quad \text{[Formula 1]}$$

In Formula 1, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \le p \le 7$ and $0 \le q \le 0.5$, respectively.

The positive electrode for a lithium secondary battery according to the present technology has a structure in which a mixture layer is disposed on the positive electrode current collector, wherein the positive electrode mixture layer has a configuration including a positive electrode active material and a positive electrode additive.

Here, the positive electrode active material may be a lithium composite transition metal oxide including two or more elements selected from the group consisting of nickel (Ni), cobalt (Co), manganese (Mn), aluminum (Al), zinc (Zn), titanium (Ti), magnesium (Mg), chromium (Cr) and zirconium (Zr). For example, the positive electrode active material may be a lithium metal composite oxide represented by Formula 2, enabling reversible intercalation and deintercalation:

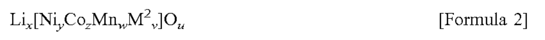

$Li_x[Ni_yCo_zMn_wM^2_v]O_u$ [Formula 2]

In Formula 2, $M^2$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v and u are $1.0 \leq x \leq 1.30$, $0.1 \leq y \leq 0.95$, $0.01 \leq z \leq 0.5$, $0.01 \leq w \leq 0.5$, $0 \leq v \leq 0.2$, $1.5 \leq u \leq 4.5$, respectively.

The lithium metal composite oxide represented by Formula 2 is a metal oxide including lithium, nickel, cobalt, and manganese, and in some cases, may have a form doped with a different transition metal ($M^2$). For example, the positive electrode active material may include one or more compounds selected from the group consisting of $LiNi_{1/3}Co_{1/3}Mn_{1/3}O_2$, $LiNi_{0.6}Co_{0.2}Mn_{0.2}O_2$, $LiNi_{0.8}Co_{0.1}Mn_{0.1}O_2$, $LiNi_{0.9}Co_{0.05}Mn_{0.05}O_2$, $LiNi_{0.8}Co_{0.1}Mn_{0.05}Al_{0.05}O_2$, and $LiNi_{0.7}Co_{0.1}Mn_{0.1}Al_{0.1}O_2$. As an example, in the positive electrode active material, as the lithium metal composite oxide represented by Formula 2, $LiNi_{0.6}Co_{0.2}Mn_{0.2}O_2$, $LiNi_{0.8}Co_{0.1}Mn_{0.05}Al_{0.05}O_2$ or $LiNi_{0.7}Co_{0.1}Mn_{0.1}Al_{0.1}O_2$ may be used alone or in combination.

In addition, the content of the positive electrode active material may be 85 to 95 parts by weight, specifically, 88 to 95 parts by weight, 90 to 95 parts by weight, 86 to 90 parts by weight, or 92 to 95 parts by weight with respect to 100 parts by weight of the positive electrode mixture layer.

Moreover, the positive electrode mixture layer may include a positive electrode additive imparting an irreversible capacity along with a positive electrode active material exhibiting electrical activity, wherein the positive electrode additive may include a lithium cobalt oxide represented by Formula 1 below:

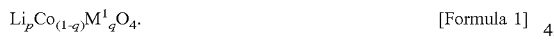

$Li_pCo_{(1-q)}M^1_qO_4$. [Formula 1]

In Formula 1, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \leq p \leq 7$ and $0 \leq q \leq 0.5$, respectively.

The positive electrode additive may contain lithium in excess to provide lithium for lithium consumption caused by an irreversible, chemical and physical reaction at a negative electrode upon initial charging, i.e., activation, thereby increasing charging capacity, reducing irreversible capacity, and improving lifetime characteristics.

Among these, the positive electrode additive represented by Formula 1 may have a higher content of lithium ions than a nickel-containing oxide that is commonly used in the art, and thus can replenish lithium ions lost through an irreversible reaction during the initial charging (activation) of the battery, so the charging/discharging capacity of the battery can be significantly improved. In addition, compared to the iron and/or manganese-containing oxide(s) commonly used in the art, there is no side reaction caused by the elution of a transition metal during the charging/discharging of the battery, so excellent stability of the battery is exhibited. Examples of the lithium cobalt oxides represented by Formula 1 may include $Li_6CoO_4$, $Li_6Co_{0.5}Zn_{0.5}O_4$, and $Li_6Co_{0.7}Zn_{0.3}O_4$.

Moreover, the average particle size of the lithium cobalt oxide represented by Formula 1 may be 0.1 to 10 μm, and specifically, 0.1 to 8 μm; 0.1 to 5 μm; 0.1 to 3 μm; 0.5 to 2 μm; 0.1 to 0.9 μm; 0.1 to 0.5 μm; 0.6 to 0.9 μm; 1 to 4 μm; 1.5 to 3.5 μm; 4 to 6 μm; 5 to 10 μm; or 6 to 9 μm. As the average particle size of the lithium cobalt oxide of the present technology is controlled within the above range, the irreversible activity of the lithium cobalt oxide may increase, and a decrease in the powder electrical conductivity of the lithium cobalt oxide may be prevented.

In addition, the positive electrode additive may be included at 0.01 to 5 parts by weight, and specifically, 0.01 to 4 parts by weight; 0.01 to 3 parts by weight; 0.01 to 2 parts by weight; 0.1 to 1 parts by weight; 0.5 to 2 parts by weight; 1 to 3 parts by weight; 2 to 4 parts by weight; 1.5 to 3.5 parts by weight; 0.5 to 1.5 parts by weight; 1 to 2 parts by weight; 0.1 to 0.9 parts by weight; or 0.3 to 1.2 parts by weight with respect to 100 parts by weight of the positive electrode mixture layer.

In addition, the lithium cobalt oxides represented by Formula 1 may have a tetragonal crystalline structure, and among them, may be included in a space group of $P4_2/nmc$, which has a twisted tetrahedral structure of cobalt and oxygen elements. Since the positive electrode additive having a twisted tetrahedral structure has a twisted tetragonal structure consisting of a cobalt element and an oxygen element and thus is structurally instable, a side reaction and/or a large amount of oxygen gas may be generated in the battery during charging/discharging as well as initial charging/discharging. However, in the present technology, by partially introducing a region with a needle-shaped crack structure to the positive electrode mixture layer during the initial charging (activation), the amount of gas such as oxygen generated by an irreversible additive, which is a positive electrode additive, may be reduced, and it is possible to ensure a migration path of lithium ions and/or electrons, thereby improving the battery safety and electrical performance of the lithium secondary battery.

Specifically, in the positive electrode for a lithium secondary battery according to the present technology, the cross-sectional structure of the positive electrode mixture layer after the initial charging (activation) may include a first region having a dense structure filled with first metal oxide particles and a second region having a needle-shaped crack structure inside and outside second metal oxide particles. More specifically, the first region refers to a region including the lithium metal composite oxide represented by Formula 2 as a first metal oxide. Since the first metal oxide can be reversibly intercalated and deintercalated during the charging/discharging of the lithium secondary battery, in the first metal oxide included in this region, lithium loss is not induced by the charging/discharging of the lithium secondary battery, and in some cases, even when the lithium loss occurs, it may be negligible. Therefore, the first region may be densely filled with first metal oxide particles without any cracks, or in some cases, a dense structure including insignificant cracks of less than 5 nm, observed through SEM. The second region refers to a region consisting of the lithium cobalt oxide of Formula 1 as a second metal oxide. As the second metal oxide has lithium loss through an irreversible electrochemical reaction during the initial charging of the lithium secondary battery, in the second metal oxide included in this region, loss is induced by the charging/discharging of the lithium secondary battery. Accordingly, the second region may have a structure in which a needle-shaped crack is formed by lithium loss occurring inside and outside a plurality of densely filled second metal oxide particles (specifically, inside and on the surface of the second metal oxide particles); or at the interface between the second metal oxide particles.

Moreover, the first region and the second region may constitute a positive electrode mixture layer, and the first region may act as a continuous phase, so the second region, which is a dispersed phase, may have a structure that is uniformly dispersed as an island shape in the first region. In this case, the area ratio of the second region may account for 0.001 to 10%, and more specifically, 0.001 to 8%; 0.001 to 6%; 0.001 to 5%; 0.001 to 3%; 0.001 to 2%; 0.05 to 2%; 0.1 to 2%; or 0.1 to 0.9%, of the total cross-sectional area of the positive electrode mixture layer. In the present technology, since the cross-section of the positive electrode mixture layer after the initial charging (activation) has a structure in which a second region is uniformly dispersed in a specific area ratio in a first region, side reactions and/or the generation of gas such as oxygen (02) caused by the positive electrode additive during charging/discharging after activation may be minimized or prevented.

In addition, the crack structure formed in the second region may have a needle-shaped structure with an average thickness of 5 to 800 nm and an average length of 50 nm to 10 μm.

Specifically, the needle-shaped crack may have an average thickness of 5 to 700 nm; 5 to 250 nm; 5 to 100 nm; 5 to 50 nm; 5 to 25 nm; 10 to 30 nm; 15 to 60 nm; 50 to 200 nm; 80 to 250 nm; 100 to 300 nm; 150 to 300 nm; 200 to 400 nm; 250 to 500 nm; or 500 to 800 nm.

In addition, the needle-shaped crack may have an average length of 50 nm to 8 μm; 50 nm to 6 μm; 50 nm to 5 μm; 50 nm to 3 μm; 50 nm to 2 μm; 50 nm to 1 μm; 50 to 900 nm; 50 to 750 nm; 50 to 500 nm; 50 to 250 nm; 100 to 500 nm; 100 to 900 nm; 200 to 400 nm; 500 to 900 nm; 900 nm to 2 μm; 1 to 10 μm; 1 to 8 μm; 1 to 5 μm; 1 to 3 μm; 5 to 10 μm; 2 to 6 μm; 4 to 7 μm; 1 to 3 μm; 2 to 4 μm; or 0.8 μm to 1.2 μm.

Here, the average length may refer to the length of the major axis, which is the longest segment among a straight line passing through the center of the crack and a segment having the center as an intersection point; and the average thickness may refer to the length of the minor axis, which is the shortest segment, among a line orthogonal to the major axis and passing through the center of the crack and a segment having the center as an intersection point. In addition, the needle-shaped crack may be connected to an adjacent needle-shaped crack to form a single line shape (e.g., a straight line or a curved line), and as the line shape is repeated, crack structures including ridges and valleys may be randomly formed.

In one example, the second region may include a needle-shaped crack with an average thickness of 10 to 100 nm and an average length of 300 nm to 1 μm.

In another example, the second region may include a needle-shaped crack with an average thickness of 400 to 700 nm and an average length of 2 to 7 μm.

In still another example, the second region may have a structure in which a first needle-shaped crack with an average thickness of 10 to 100 nm and an average length of 300 nm to 1 μm and a second needle-shaped crack with an average thickness of 400 to 700 nm and an average length of 2 nm to 7 μm are mixed.

In yet another example, the second region may include a needle-shaped structure with an average thickness of 50 to 90 nm and an average length of 500 to 1,500 nm, and the needle-shaped structures may be irregularly disposed and connected.

In addition, the crack structure formed in the second region may include a plurality of needle-shaped cracks, and the needle-shaped cracks may be irregularly formed; in some cases, the cracks may be oriented in one direction or oriented based on one point to form a radial shape; or may be connected to form an irregular network structure, but the present technology is not limited thereto.

In the present technology, by controlling the shape and size of cracks formed in the second region, side reactions and/or a gas such as oxygen (02) generated by the positive electrode additive represented by Formula 1 may be improved during charging/discharging after initial charging (activation).

Further, the shape or size of the crack structure formed in the second region may control the initial charging conditions, that is, activation conditions, of the lithium secondary battery. Specifically, the crack structure of the second region may be formed by activating the lithium secondary battery under a constant current condition of 0.6 to 50 mA; or in some cases, under conditions of a charging final voltage of 4.2V or less and a constant current-constant voltage of 1.0 C or less, and the activation may be performed in stages according to SOC.

For example, the crack structure of the second region may be implemented by continuously performing a three-step charging process, that is, 1 to 3 steps of activation in the initial charging of the positive electrode for a lithium secondary battery. Specifically, the initial charging may be performed by three steps: a first step of activation for charging the lithium secondary battery to an SOC of 30% or more and less than 40% by applying a current of 0.05 C to 0.3 C; a second step of activation for charging the lithium secondary battery having undergone the first step of activation to an SOC of 40% or more and less than 50% by applying a current of 0.3 C to 0.5 C; and a third step of activation for charging the lithium secondary battery having undergone the second step of activation to an SOC of 50% or more and less than 60% by applying a current of 0.6 C to 0.9 C.

In one example, the crack structure of the second region may be formed by performing three steps: a first step of activation for charging the lithium secondary battery to an SOC of 30 to 39% by applying a current of 0.08 C to 0.15 C during initial charging; a second step of activation for charging the lithium secondary battery having undergone the first step of activation to an SOC of 40 to 49% by applying a current of 0.35 C to 0.45 C; and a third step of activation of charging the lithium secondary battery having undergone the second step of activation to an SOC of 50 to 59% by applying a current of 0.65 C to 0.8 C.

Meanwhile, the positive electrode mixture layer may further include a conductive material, a binder, or an additive in addition to the positive electrode active material and the positive electrode additive.

Here, the conductive material may be used to improve the performance of the positive electrode, such as electric conductivity, and may include one or more selected from the group consisting of natural graphite, artificial graphite, carbon black, acetylene black, Ketjen black, a carbon nanotube, graphene, and a carbon fiber. For example, the conductive material may include acetylene black.

In addition, the conductive material may be included at 0.5 to 5 parts by weight, and specifically, 0.5 to 4 parts by weight; 0.5 to 3 parts by weight; 0.5 to 1 part by weight; 0.5 to 2 parts by weight; 1 to 3 parts by weight; 2 to 4 parts by weight; 1.5 to 3.5 parts by weight; 0.5 to 1.5 parts by weight; or 1 to 2 parts by weight, with respect to 100 parts by weight of the positive electrode mixture layer.

Moreover, the binder may include one or more resins selected from the group consisting of a polyvinylidene fluoride-hexafluoropropylene copolymer (PVdF-co-HFP), polyvinylidene fluoride (PVdF), polyacrylonitrile, polymethylmethacrylate, and a copolymer thereof. In one example, the binder may include polyvinylidene fluoride.

In addition, with respect to a total of 100 parts by weight of the positive electrode mixture layer, the binder may be included at 1 to 10 parts by weight, and specifically, 2 to 8 parts by weight, or 1 to 5 parts by weight.

Moreover, the average thickness of the positive electrode mixture layer may be, but is not particularly limited to, specifically, 50 to 300 μm, and more specifically, 100 to 200 μm; 80 to 150 μm; 120 to 170 μm; 150 to 300 μm; 200 to 300 μm; or 150 to 190 μm.

In addition, in the positive electrode, one that has high conductivity without causing a chemical change in the battery may be used as a positive electrode current collector. For example, as the positive electrode collector, stainless steel, aluminum, nickel, titanium, or calcined carbon may be used, and in the case of aluminum or stainless steel, one that is surface treated with carbon, nickel, titanium or silver may also be used. In addition, the positive electrode current collector may have fine irregularities formed on a surface thereof to increase the adhesion of the positive electrode active material, and may be formed in various shapes such as a film, a sheet, a foil, a net, a porous body, a foam body, and a non-woven fabric body. Moreover, the average thickness of the current collector may be appropriately applied within 3 to 500 μm in consideration of the conductivity and total thickness of the positive electrode to be manufactured.

Lithium Secondary Battery

Furthermore, in one embodiment of the present invention, a lithium secondary battery is provided, including the above-described positive electrode according to the present technology, a negative electrode, and a separator interposed between the positive electrode and the negative electrode.

The lithium secondary battery according to the present technology includes the positive electrode of the present technology described above, and thus can exhibit excellent characteristics such as battery safety and electric performance. The lithium secondary battery of the present technology has a structure including the above-described positive electrode; a negative electrode; and a separator interposed between the positive electrode and the negative electrode.

Here, for the negative electrode, a negative electrode mixture layer is formed by applying, drying and pressing a negative electrode active material on a negative electrode current collector, and the negative electrode may selectively further include a conductive material, an organic binder polymer, or an additive as necessary, like the positive electrode.

In addition, the negative electrode active material may include, for example, a carbon material and a silicon material. The carbon material refers to a carbon material including a carbon atom as a main component, and examples of the carbon material may include graphite having a completely layered crystalline structure such as natural graphite, soft carbon having a low crystalline layered crystalline structure (graphene structure; a structure in which hexagonal honeycomb planes of carbon are arranged in layers) and hard carbon in which the above-described structure is mixed with amorphous parts, artificial graphite, expanded graphite, carbon nanofibers, non-graphitizing carbon, carbon black, acetylene black, Ketjen black, carbon nanotubes, fullerenes, activated carbon, and graphene, and preferably, one or more selected from the group consisting of natural graphite, artificial graphite, graphene and carbon nanotubes. More preferably, the carbon material includes natural graphite and/or artificial graphite, and may include any one or more of graphene and carbon nanotubes in addition to the natural graphite and/or artificial graphite. In this case, the carbon material may include 50 to 95 parts by weight, and more specifically, 60 to 90 parts by weight or 70 to 80 parts by weight of graphene and/or carbon nanotubes with respect to a total of 100 parts by weight of the carbon material.

In addition, the silicon material is a particle including silicon (Si), which is a metal component, as a main component, and may include one or more of a silicon (Si) particle and a silicon oxide ($SiO_x$, $1 \leq X \leq 2$) particle. In one example, the silicon material may include a silicon (Si) particle, a silicon monoxide (SiO) particle, a silicon dioxide ($SiO_2$) particle, or a mixture thereof.

Moreover, the silicon material may have a form in which a crystalline particle and an amorphous particle are mixed, and the proportion of the amorphous particles may be 50 to 100 parts by weight, and specifically, 50 to 90 parts by weight; 60 to 80 parts by weight, or 85 to 100 parts by weight based on 100 parts by weight of the entire silicon material. In the present technology, thermal stability and flexibility may be improved without degrading the electrical properties of an electrode by controlling the proportion of the amorphous particles included in the silicon material to the above range.

In addition, the silicon material contains a carbon material and a silicon material, and may be included at 1 to 20 parts by weight, and particularly, 5 to 20 parts by weight; 3 to 10 parts by weight; 8 to 15 parts by weight; 13 to 18 parts by weight; or 2 to 7 parts by weight based on 100 parts by weight of the negative electrode mixture layer.

In the present technology, an amount of lithium consumption and an irreversible capacity loss during the initial charging/discharging of the battery may be reduced and charging capacity per unit mass may also be improved by adjusting the contents of the carbon material and the silicon material included in the negative electrode active material to the above range.

In one example, the negative electrode active material may include 95±2 parts by weight of graphite; and 5±2 parts by weight of a mixture in which silicon monoxide (SiO) particles and silicon dioxide ($SiO_2$) particles are uniformly mixed with respect to 100 parts by weight of the negative electrode mixture layer. In the present technology, an amount of lithium consumption and an irreversible capacity loss during the initial charging/discharging of the battery may be reduced and charging capacity per unit mass may also be improved by adjusting the contents of the carbon material and the silicon material included in the negative electrode active material to the above range.

In addition, the negative electrode mixture layer may have an average thickness of 100 to 200 μm, and specifically, 100 to 180 μm, 100 to 150 μm, 120 to 200 μm, 140 to 200 μm, or 140 to 160 μm.

Moreover, the negative electrode current collector is not particularly limited as long as it does not cause a chemical change in the battery and has high conductivity, and for example, copper, stainless steel, nickel, titanium, or calcined carbon may be used, and in the case of copper or stainless steel, one whose surface is treated with carbon, nickel, titanium or silver may be used. In addition, the negative electrode current collector, like the positive electrode current collector, has fine irregularities on a surface thereof to reinforce the adhesion of the negative electrode active material and may be formed in various shapes such as a film, a sheet, a foil, a net, a porous body, a foam body, and a non-woven fabric body. In addition, the average thickness of the negative electrode current collector may be suitably applied within 3 to 500 μm in consideration of the conductivity and total thickness of the negative electrode to be formed.

In addition, as the separator, an insulating thin film, which is interposed between a positive electrode and a negative electrode and has high ion permeability and mechanical strength, is used. The separator is not particularly limited as long as it is conventionally used in the art, and specifically, a sheet or non-woven fabric made of chemically-resistant and hydrophobic polypropylene, a glass fiber, or polyethylene may be used. In some cases, a composite separator in which a porous polymer base material such as a sheet or non-woven fabric is coated with inorganic/organic particles by an organic binder polymer may be used. When a solid electrolyte such as a polymer is used as an electrolyte, the solid electrolyte may also serve as a separator. Moreover, the separator may have a pore diameter of 0.01 to 10 μm and a thickness of 5 to 300 μm on average.

Meanwhile, the positive electrode and the negative electrode may be wound in a jelly roll shape and accommodated in a cylindrical, prismatic or pouch-type battery, or accommodated in a pouch-type battery in a folding or stack-and-folding form, but the present technology is not limited thereto.

In addition, a lithium salt-containing electrolyte according to the present technology may consist of an electrolyte and a lithium salt, and as the electrolyte, a non-aqueous organic solvent, an organic solid electrolyte, or an inorganic solid electrolyte may be used. As the non-aqueous organic solvent, for example, aprotic organic solvents such as N-methyl-2-pyrrolidinone, ethylene carbonate, propylene carbonate, butylene carbonate, dimethyl carbonate, diethyl carbonate, γ-butyrolactone, 1,2-dimethyoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

As the organic solid electrolyte, for example, polymers such as a polyethylene derivative, a polyethylene oxide derivative, a polypropylene oxide derivative, a phosphoric acid ester polymer, polyalginate lysine, polyester sulfide, polyvinyl alcohol, polyvinylidene fluoride, and polymers including an ionic dissociation group may be used.

As the inorganic solid electrolyte, for example, an Li nitride, halide or sulfate such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$ may be used.

The lithium salt is a material that is readily soluble in the non-aqueous electrolyte, and may be, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2$ NLi, chloroborane lithium, lower aliphatic carboxylic acid lithium, lithium tetraphenylborate, or lithium imide.

In addition, to improve charging/discharging characteristics and flame retardancy, for example, pyridine, triethylphosphite, triethanolamine, cyclic ether, ethylene diamine, n-glyme, hexamethyl phosphoric triamine, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride may be added to the electrolyte. In some cases, to impart incombustibility, a halogen-containing solvent such as carbon tetrachloride or ethylene trifluoride may be further included, and to enhance high-temperature storage properties, carbon dioxide gas may be further included, and fluoro-ethylene carbonate (FEC) or propene sultone (PRS) may be also included.

EXAMPLES

Hereinafter, the present invention will be described in further detail with reference to examples and an experimental example.

However, the following examples and experimental example merely illustrate the present invention, and the content of the present invention is not limited to the following examples and experimental example.

Examples 1 to 3 and Comparative Examples 1 to 4. Manufacture of Lithium Secondary Battery a) Manufacture of Positive Electrode for a Lithium Secondary Battery A positive electrode slurry for a lithium secondary battery was prepared by injecting N-methyl pyrrolidone into a homo mixer, weighing and inputting 97 parts by weight of a positive electrode active material $LiNi_{0.6}Co_{0.2}Mn_{0.2}O_2$, 0.8 parts by weight of a positive electrode additive $Li_6CoO_4$ or $Li_6Co_{0.7}Zn_{0.3}O_4$; 0.7 parts by weight of a conductive material, which is a mixture of carbon nanotubes (average size: 60±10 nm) and Denka black (average size: 2±0.5 μm) (75:25 wt./wt.); and 1.5 parts by weight of a binder PVdF with respect to 100 parts by weight of the solid content of the positive electrode slurry, and mixing the resultant at 2,000 rpm for 60 minutes. A positive electrode was manufactured by applying the prepared positive electrode slurry to one surface of an aluminum current collector, drying the slurry at 100° C., and rolling the resultant. Here, the total thickness of the positive electrode mixture layer was 130 and the total thickness of the manufactured positive electrode was approximately 200 μm.

b) Manufacture of Lithium Secondary Battery

With respect to 100 parts by weight of the solid content of a negative electrode slurry, 84 parts by weight of a negative electrode active material natural graphite and 14 parts by weight of silicon ($SiO_x$, $1 \le x \le 2$) particles; and 2 parts by weight of a binder styrene butadiene rubber (SBR) were prepared, and a negative electrode slurry was prepared in the same manner as the positive electrode slurry. Here, the graphite used in the formation of the negative electrode mixture layer was natural graphite (average particle diameter: 0.01 to 0.5 μm), and the silicon ($SiO_x$) particles had an average particle size of 0.9 to 1.1 μm. A negative electrode was manufactured by applying the prepared negative electrode slurry to one surface of a copper current collector, drying the slurry at 100° C. and rolling the resultant. Here, the total thickness of the negative electrode mixture layer was 150 μm, and the total thickness of the manufactured negative electrode was approximately 250 μm.

A battery was assembled in a full-cell type by stacking a separator (thickness: approximately 16 μm) consisting of a porous polyethylene (PE) film to be interposed between the prepared positive electrode and the negative electrode and injecting E2DVC as an electrolyte. Here, the "E2DVC" refers to a type of carbonate-based electrolyte, which is a mixed solution in which lithium hexafluorophosphate ($LiPF_6$, 1.0M) and vinyl carbonate (VC, 2 wt %) are added in a mixture of ethylene carbonate (EC): dimethyl carbonate (DMC):diethyl carbonate (DEC)=1:1:1 (volume ratio).

A lithium secondary battery was manufactured by performing initial charging of the manufactured full cell at 22±2° C. under conditions shown in Table 1 below.

TABLE 1

| | Positive electrode additive Type | Current condition for initial charging | | | |
|---|---|---|---|---|---|
| | | Final voltage | First step of activation (30% ≤ SOC ≤ 39%) | Second step of activation (40% ≤ SOC ≤ 49%) | Third step of activation (50% ≤ SOC ≤ 59%) |
| Example 1 | $Li_6CoO_4$ | 4.2 V | 0.1 C | 0.4 C | 0.7 C |
| Example 2 | $Li_6Co_{0.7}Zn_{0.3}O_4$ | 4.2 V | 0.1 C | 0.4 C | 0.7 C |
| Example 3 | $Li_6CoO_4$ | 4.2 V | | 0.5 C | |
| Comparative Example 1 | $Li_6CoO_4$ | 4.2 V | | 0.005 C | |
| Comparative Example 2 | $Li_6CoO_4$ | 4.2 V | | 3.0 C | |
| Comparative Example 3 | $Li_6CoO_4$ | 4.5 V | 0.1 C | 0.4 C | 0.7 C |
| Comparative Example 4 | $Li_6CoO_4$ | 4.5 V | 0.1 C | 1.0 C | 2.0 C |

Experimental Example

To evaluate the performance of the positive electrode for a secondary battery according to the present technology, the following experiments were carried out.

a) Analysis of Cross-Sectional Structure of Positive Electrode Mixture Layer after Initial Charging Samples were prepared by separating a positive electrode from the initially-charged lithium secondary batteries in Examples 1 to 3 and Comparative Examples 1 to 4 and peeling a positive electrode mixture layer from the separated positive electrode, and SEM analysis was performed on the cross-section of each sample prepared above. The result is shown in FIGS. 1(*a*) and 1(*b*).

From the result, as shown in FIGS. 1(*a*) and 1(*b*), it was confirmed that the positive electrode mixture layers separated from the lithium secondary batteries of Examples 1 to 3 had a structure in which fine needle-shaped cracks were formed in an island shape inside and on the surface of some of metal oxides, specifically, a positive electrode additive particle shown in gray and at the interface between the positive electrode additive particles, while there were no cracks because of dense filling by the positive electrode active material particles shown in white. Here, it was confirmed that the needle-shaped cracks had a structure in which a first crack with an average thickness of 10 to 100 nm and an average length of 150 to 400 nm; and a second crack with an average thickness of 500 to 750 nm and an average length of 5.5 μm to 7.3 μm were mixed. It was confirmed that some of the first cracks and the second cracks were irregularly connected to form one line shape (e.g., a straight light or a curved line). In addition, it was seen that the crack structure accounted for 0.5 to 5% of the entire cross-sectional area.

In contrast, it was confirmed that the positive electrode mixture layers separated from the lithium secondary batteries of Comparative Examples 1 to 4 had a crack structure all over the cross-section of the mixture layer, or had a structure in which regions having a crack structure were formed in an island shape in the positive electrode additive particles like the positive electrode mixture layers of the examples. However, it was confirmed that the average thickness and average length of the formed cracks were significantly larger than those of the cracks of the Examples, and the cracks accounted for 10% or more of the entire cross-sectional area of the mixture layer.

From the above result, it can be seen that, in the positive electrode for a lithium secondary battery according to the present technology, cracks formed in the positive electrode mixture layer can be controlled in the activation.

b) Evaluation of Amount of Cumulative Gas Generation in Charging/Discharging after Initial Charging After degassing was performed on the initially-charged lithium secondary batteries of Examples 1 to 3 and Comparative Examples 1 to 4, the lithium secondary batteries were discharged to a final voltage of 2V with a discharge current of 0.1 C, and the secondary batteries from which internal gas was removed were repeatedly charged/discharged 50 times at 45° C. under conditions of 4.5V and 1.0 C. Here, the amount of cumulative gas generated after initial charging/discharging was measured by measuring the amount of gas generated in each charging/discharging. The result is shown in Table 2 below.

c) Evaluation of Cycle Life Performance

A degassing process was performed on initial-charged lithium secondary batteries of Examples 1 to 3 and Comparative Examples 1 to 4, and the batteries were discharged with a discharging current of 0.1 C until a final voltage of 2V, and then subjected to 100 cycles of charging/discharging (n=100) of the batteries under conditions of 25° C., a charge final voltage of 4.25V, a discharge final voltage of 2.5V, and 0.5 C/0.5 C, followed by measuring capacity retention rates

[%]. Here, the capacity retention rates were calculated using Equation 1 below, and the result is shown in Table 2 below:

Capacity retention rate (%)=(discharging capacity at 100 cycles of charging/discharging/discharging capacity at initial cycle of charging/discharging)×100 [Equation 1]

TABLE 2

| | Amount of cumulative gas [ml/g] | Initial charging capacity [mAh] | Capacity retention rate [%] after 100 cycles of charging/discharging |
|---|---|---|---|
| Example 1 | 26 | 104.6 | 98 |
| Example 2 | 39 | 105.2 | 97 |
| Example 3 | 31 | 104.8 | 97 |
| Comparative Example 1 | 249 | 100.7 | 93 |
| Comparative Example 2 | 188 | 100.9 | 89 |
| Comparative Example 3 | 314 | 101.7 | 88 |
| Comparative Example 4 | 257 | 99.5 | 90 |

As shown in Table 2, the positive electrode for a lithium secondary battery according to the present technology contained a positive electrode additive represented by Formula 1, and also had a configuration in which a specific crack structure was introduced into the cross-section of the positive electrode mixture layer after the initial charging, thereby it can be seen that the safety and electrical performance of the lithium secondary battery were excellent.

Specifically, it was confirmed that, in the lithium secondary batteries manufactured in the Examples, the amount of gas generated in charging/discharging after the degassing of the gas generated in the initial charging/discharging was significantly reduced. In addition, it was confirmed that the lithium secondary batteries had a high initial charging capacity of 103 mAh or more and a high capacity retention rate of 95% or more.

On the other hand, in the lithium secondary batteries manufactured in the Comparative Examples, a large amount of gas was generated by promoting the decomposition of an electrolyte during charging/discharging after the initial charging (activation). In addition, it was confirmed that the lithium secondary batteries of the Comparative Examples showed a low initial charging capacity of less than 102 mAh and a capacity retention rate after 100 cycles of charging/discharging of less than 94% due to the electrolyte decomposition.

From the above result, as the positive electrode for a lithium secondary battery contains the positive electrode additive represented by Formula 1, and has a positive electrode mixture layer including a region with a needle-shaped crack structure in its cross-section after initial charging (activation), the amount of gas such as oxygen generated by an irreversible additive, which is a positive electrode additive, in charging/discharging after the initial charging is reduced, and the migration path of lithium ions and/or electrons can be ensured, resulting in an excellent effect of improving the battery safety and electrical performance of the lithium secondary battery.

In the above, the present invention has been described with reference to exemplary embodiments, but it should be understood by those skilled in the art or those of ordinary skill in the art that the present invention can be variously modified and changed without departing the spirit and technical scope of the present invention described in the accompanying claims.

Accordingly, the technical scope of the present invention is not limited to the content described in the detailed description of the specification, but should be defined by the claims.

The invention claimed is:

1. A positive electrode for a lithium secondary battery, comprising:

a positive electrode current collector, and a positive electrode mixture layer which is disposed on at least one surface of the positive electrode current collector and which comprises a positive electrode active material represented by Formula 2 and a positive electrode additive represented by Formula 1, wherein a cross-sectional structure of the positive electrode mixture layer after initial charging comprises:

a first region having a structure filled with the positive electrode active material, and a second region having a needle-shaped crack structure inside and outside the positive electrode additive, wherein the second region accounts for 0.001 to 10% of a total cross-sectional area of the positive electrode mixture layer, and wherein the needle-shaped crack structure has cracks with an average thickness of 5 to 800 nm and an average length of 50 nm to 10 μm,

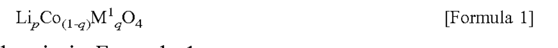

$Li_pCo_{(1-q)}M^1_qO_4$ [Formula 1]

wherein in Formula 1, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \leq p < 7$ and $0 \leq q \leq 0.5$, respectively

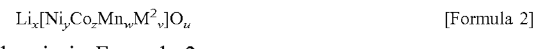

$Li_x[Ni_yCo_zMn_wM^2_v]O_u$ [Formula 2]

wherein in Formula 2, $M^2$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v and u are $1.0 \leq x \leq 1.30$, $0.1 \leq y < 0.95$, $0.01 < z \leq 0.5$, $0.01 < w \leq 0.5$, $0 \leq v \leq 0.2$, $1.5 \leq u \leq 4.5$, respectively.

2. The positive electrode of claim 1, wherein the needle-shaped crack structure has an island shape.

3. The positive electrode of claim 1, wherein the positive electrode additive has a tetragonal structure with a space group of $P4_2/nmc$.

4. The positive electrode of claim 1, wherein the positive electrode mixture layer further comprises one or more conductive materials selected from the group consisting of natural graphite, artificial graphite, carbon black, acetylene black, and a carbon fiber.

5. A lithium secondary battery comprising the positive electrode of claim 1, a negative electrode, and a separator disposed between the positive electrode and the negative electrode.

6. The battery of claim 5, wherein the negative electrode comprises a negative electrode current collector; and a negative electrode mixture layer which is disposed on at least one surface of the negative electrode current collector and which contains a negative electrode active material, and wherein the negative electrode active material contains a carbon material and a silicon material.

7. The battery of claim 6, wherein the silicon material comprises one or more of a silicon (Si) particle and a silicon oxide ($SiO_x$, $1 \leq X \leq 2$) particle.

8. The battery of claim 6, wherein the silicon material is comprised at 1 to 20 parts by weight with respect to 100 parts by weight of the negative electrode mixture layer.

9. The battery of claim 6, wherein the carbon material comprises one or more of natural graphite, artificial graphite, carbon black, acetylene black, carbon fiber, graphene or a carbon nanotube.

* * * * *